United States Patent [19]

Shimura

[11] Patent Number: 4,776,029
[45] Date of Patent: Oct. 4, 1988

[54] METHOD OF COMPRESSING IMAGE SIGNALS

[75] Inventor: Kazuo Shimura, Kanagawa, Japan

[73] Assignee: Fuji Photo Film Co., Ltd., Kanagawa, Japan

[21] Appl. No.: 39,879

[22] Filed: Apr. 20, 1987

[30] Foreign Application Priority Data

Apr. 18, 1986 [JP] Japan .................................. 61-90531

[51] Int. Cl.$^4$ .......................... G06K 9/00; H04N 7/12
[52] U.S. Cl. ....................................... 382/56; 358/136
[58] Field of Search ............... 358/133, 135, 136, 138; 382/56

[56] References Cited

U.S. PATENT DOCUMENTS

| | | | |
|---|---|---|---|
| 4,125,861 | 11/1978 | Mounts et al. | 358/133 |
| 4,268,861 | 5/1981 | Schreiber et al. | 358/138 |
| 4,353,096 | 10/1982 | Sakurai | 358/138 |
| 4,460,923 | 7/1984 | Hirano et al. | 358/136 |
| 4,675,733 | 6/1987 | Tanimoto | 356/136 |
| 4,683,494 | 7/1987 | Furukawa et al. | 358/135 |

Primary Examiner—Leo H. Boudreau
Assistant Examiner—Donald J. Daley
Attorney, Agent, or Firm—Sughrue, Mion, Zinn, Macpeak, and Seas

[57] ABSTRACT

A method of compressing image signals comprises the step of dividing the image signals into main signals sampled at appropriate intervals and interpolation signals other than the main signals. As for said main signals, prediction encoding compression processing is carried out between the main signals. As for the interpolation signals, prediction encoding compression processing is carried out based on the main signals. At least for the interpolation signals, quantization processing for making the bit resolution coarse is carried out in the course of encoding. The quantization processing of the interpolation signals is carried out for making the bit resolution coarser than the bit resolution of the main signals.

9 Claims, 6 Drawing Sheets

FIG.2

|   |   |   |   |   |
|---|---|---|---|---|
|   | b | c | d |   |
|   | e | a | f |   |
|   | g | h | i |   |
| M |   | P |   |   |

FIG.3

| $x_{11}$ | $x_{12}$ | $x_{13}$ | $x_{14}$ | $x_{15}$ | $x_{16}$ |
| $x_{21}$ | $x_{22}$ | $x_{23}$ | $x_{24}$ | $x_{25}$ | $x_{26}$ |
| $x_{31}$ | $x_{32}$ | $x_{33}$ | $x_{34}$ | $x_{35}$ | $x_{36}$ |
| $x_{41}$ | $x_{42}$ | $x_{43}$ | $x_{44}$ | $x_{45}$ | $x_{46}$ |
| $x_{51}$ | $x_{52}$ | $x_{53}$ | $x_{54}$ | $x_{55}$ | $x_{56}$ |

FIG.4

| $a_{11}$ | $b_{12}$ | $a_{13}$ | $b_{14}$ | $a_{15}$ | $b_{16}$ |
| $b_{21}$ | $b_{22}$ | $b_{23}$ | $b_{24}$ | $b_{25}$ | $b_{26}$ |
| $a_{31}$ | $b_{32}$ | $a_{33}$ | $b_{34}$ | $a_{35}$ | $b_{36}$ |
| $b_{41}$ | $b_{42}$ | $b_{43}$ | $b_{44}$ | $b_{45}$ | $b_{46}$ |
| $a_{51}$ | $b_{52}$ | $a_{53}$ | $b_{54}$ | $a_{55}$ | $b_{56}$ |

FIG.5

| $a_{11}$ | $b_{12}$ | $a_{13}$ | $b_{14}$ | $a_{15}$ | $b_{16}$ |
| $b_{21}$ | $b_{22}$ | $b_{23}$ | $b_{24}$ | $b_{25}$ | $b_{26}$ |
| $b_{31}$ | $a_{32}$ | $b_{33}$ | $a_{34}$ | $b_{35}$ | $a_{36}$ |
| $b_{41}$ | $b_{42}$ | $b_{43}$ | $b_{44}$ | $b_{45}$ | $b_{46}$ |
| $a_{51}$ | $b_{52}$ | $a_{53}$ | $b_{54}$ | $a_{55}$ | $b_{56}$ |

FIG.6

| $a_{11}$ |   | $\Delta a_{13}$ |   | $\Delta a_{15}$ |   |
|   |   |   |   |   |   |
| $a_{31}$ |   | $\Delta a_{33}$ |   | $\Delta a_{35}$ |   |
|   |   |   |   |   |   |
| $a_{51}$ |   | $\Delta a_{53}$ |   | $\Delta a_{55}$ |   |

FIG.7

| $a_{11}'$ |   | $\Delta a_{13}'$ |   | $\Delta a_{15}'$ |   |
|   |   |   |   |   |   |
| $a_{31}'$ |   | $\Delta a_{33}'$ |   | $\Delta a_{35}'$ |   |
|   |   |   |   |   |   |
| $a_{51}'$ |   | $\Delta a_{53}'$ |   | $\Delta a_{55}'$ |   |

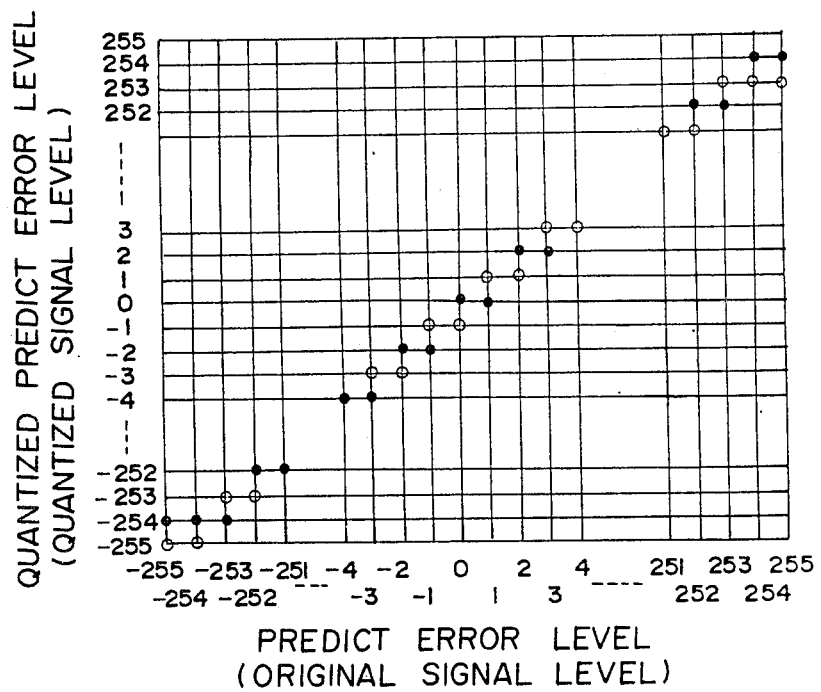

| ORIGINAL SIGNAL | --- | -4 | -3 | -2 | -1 | 0 | 1 | 2 | 3 | 4 | --- |
|---|---|---|---|---|---|---|---|---|---|---|---|
| FREQUENCY | | 2 | 5 | 20 | 50 | 100 | 50 | 20 | 5 | 2 | |
| REP. QUANTIZATION VALUES (1) | | | -2.3 | | | | 0 | | | 2.3 | |
| REP. QUANTIZATION VALUES (2) | | | -2 | | | | 0 | | | 2 | |

METHOD OF COMPRESSING IMAGE SIGNALS

BACKGROUND OF THE INVENTION

1. Field of the Invention

This invention relates to a method of compressing image signals carrying gradation by prediction encoding processing.

2. Description of the Prior Art

In recent years, image signals carrying gradations are stored in the form of digital signals on a recording medium such as an optical disk, and read from the recording medium when necessary for reproducing a visible image on a cathode ray tube (CRT) or the like. Or, the image signals are transmitted in the form of digital signals by facsimile or the like, and a visible image is reproduced on the signal receiving side based on the received image signals.

In the case where image signals are stored or transmitted in the form of digital signals, it is desirable that the amount of the digital image signals be decreased in advance. This is because, in the case of image signals carrying gradations, the amount of the digital image signals is generally very large, and the signal storing cost, the signal transmission cost, and the like becomes markedly high when the digital image signals are directly stored or transmitted.

Under the above circumstances, in the case where the image signals are to be stored or transmitted, there has heretofore been used a method wherein compression processing based on prediction encoding is carried out to compress and decrease the amount of the image signals, and the compressed image signals are stored or transmitted. When the image which the image signals represent is to be reproduced, decoding processing is carried out on the compressed image signals to expand them, and a visible image is reproduced based on the expanded image signals.

Since the purpose of image signal compression processing based on prediction encoding is to decrease the amount of the image signals which are to be, for example, stored or transmitted, the image signal compressibility should naturally be as high as possible.

One approach to improving the compressibility in the case where image signal compression is carried out by prediction encoding is to decrease the bit resolution (density resolution) of the image signals, i.e. to carry out quantization processing for quantizing the image signals more coarsely, in addition to the prediction encoding processing.

However, when the bit resolution is decreased by quantizing the image signals coarsely, though the image signal compressibility can be improved, the image quality of the reproduced visible image deteriorates, and the reproduced visible image becomes visually unsuitable for viewing purposes. Also, in the case where the reproduced visible image is to be used for medical diagnosis, the diagnostic efficiency and accuracy become low.

SUMMARY OF THE INVENTION

The primary object of the present invention is to provide a method of compressing image signals, wherein the image signal compressibility is improved by carrying out prediction encoding processing and quantization processing for making the bit resolution coarse.

Another object of the present invention is to provide a method of compressing image signals, wherein improvement of the image signal compressibility and restriction of deterioration of image quality caused by quantization processing are achieved efficiently.

The present invention provides a method of compressing image signals, which comprises the steps of:

(i) dividing said image signals into main signals sampled at appropriate intervals and interpolation signals other than said main signals, (ii) as for said main signals, carrying out prediction encoding compression processing between said main signals, (iii) as for said interpolation signals, carrying out prediction encoding compression processing based on said main signals, and (iv) at least for said interpolation signals, carrying out quantization processing for making the bit resolution coarse in the course of encoding, said quantization processing of said interpolation signals being carried out to make the bit resolution coarser than the bit resolution of said main signals.

Specifically, with the method of compressing image signals in accordance with the present invention, image signals are subjected to prediction encoding compression processing and quantization processing for making the bit resolution coarse. Quantization processing is not effected indiscriminately for all of the image signals as ordinary quantization processing of image signals. Instead, the image signals are divided into main signals and interpolation signals, and quantization processing is effected only for the interpolation signals, or effected independently for the interpolation signals and the main signals.

The main signals are sampled at appropriate intervals from the image signals, i.e. are obtained by coarse sampling from the image signals, and may be regarded as representing low spatial frequency components in the image which the image signals represent. On the other hand, the interpolation signals are adjacent signals positioned between the main signals. The interpolation signals may be regarded as representing high spatial frequency components in the image which the image signals represent.

However, in general, the low spatial frequency components express the image well though the accuracy is not high. For example, information important for diagnosis is contained more in the low spatial frequency components than in the high spatial frequency components. Also, the visual characteristics of the human are more sensitive to the low spatial frequency components than to the high spatial frequency components. Therefore, from the viewpoint of diagnostic efficiency and accuracy and maintenance of the visual image quality, the low spatial frequency components are required to exhibit a bit resolution higher than the bit resolution of the high spatial frequency components. Stated differently, the tolerance of quantization for making the bit resolution coarse is larger for the high spatial frequency components than for the low spatial frequency components.

The method of compressing image signals in accordance with the present invention is based on the aforesaid findings. In the present invention, instead of uniformly quantizing the image signals coarsely, the image signals are divided into the main signals representing the low spatial frequency components and the interpolation signals representing the high spatial frequency components, and quantization is carried out at least for the interpolation signals so that the interpolation signals for which the tolerance of quantization for making the bit resolution coarse is large are quantized more coarsely. In this manner, only the interpolation signals are quantized coarsely, or both the interpolation signals and the main signals are quantized coarsely.

Therefore, for example, when only the interpolation signals are quantized coarsely, the low spatial frequency components (i.e. the main signals) important for the diagnostic efficiency and accuracy and visual image quality are left as they are, and only the high spatial frequency components (i.e. the interpolation signals) which are not so important for the diagnostic efficiency and accuracy and visual image quality are quantized coarsely. Therefore, it is possible to restrict the decrease in the diagnostic efficiency and accuracy and the visual image quality, and to improve the signal compressibility.

Also when both the interpolation signals and the main signals are quantized coarsely, since the image signals are divided into the interpolation signals and the main signals, it is possible to quantize the interpolation signals more coarsely than the main signals. As a result, it becomes possible to efficiently achieve restriction of the decrease in the diagnostic efficiency and accuracy and deterioration of visual image quality, and the improvement of the signal compressibility.

BRIEF DESCRIPTION OF THE DRAWINGS

FIG. 2 is an explanatory view showing an example of smoothing processing, FIG. 3 is an explanatory view showing an example of sampling of main signals, FIGS. 4 and 5 are explanatory views showing examples of division of image signals into main signals and interpolation signals, FIG. 6 is an explanatory view showing prediction errors of the main signals, FIG. 7 is an explanatory view showing the main signals encoded into Huffman codes, FIG. 8 is an explanatory view showing prediction errors of the interpolation signals, FIG. 9 is an explanatory view showing an example of a combination of different quantization characteristics used for shift quantization, FIG. 10 is an explanatory view showing an example of minute blocks in the case of shift quantization.

DESCRIPTION OF THE PREFERRED EMBODIMENTS

The present invention will hereinbelow be described in further detail with reference to the accompanying drawings.

Figure 1:
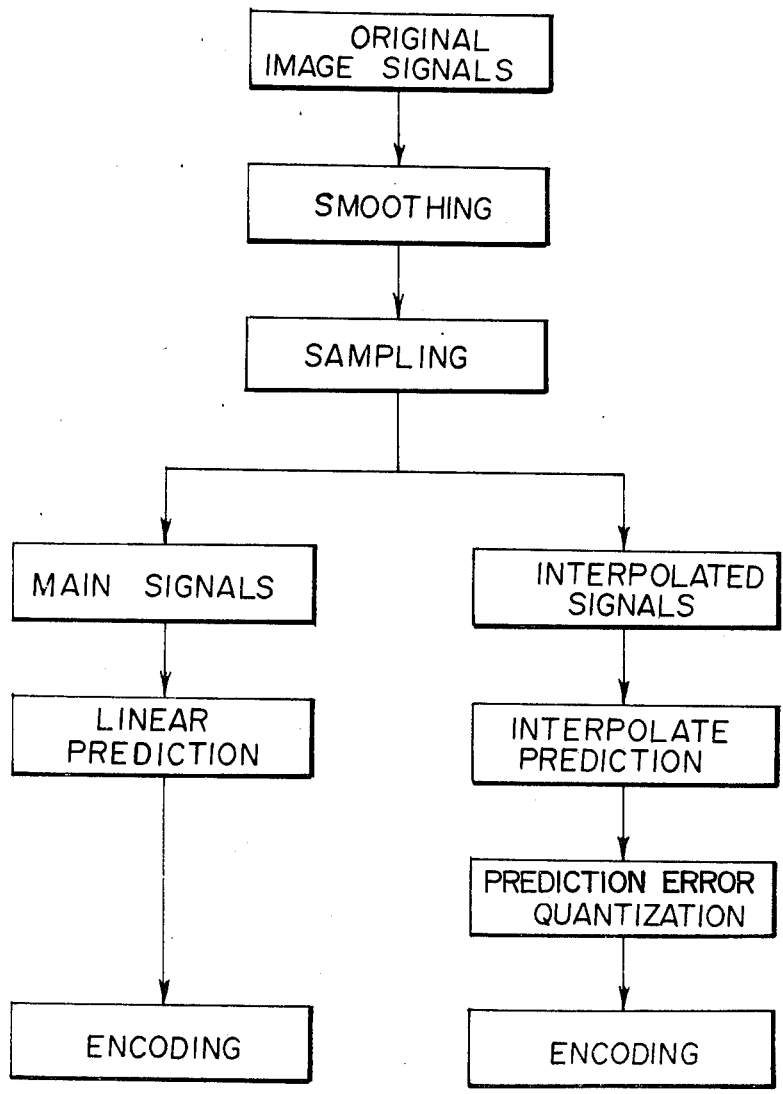
FIG. 1 is a flow chart showing an embodiment of the method of compressing image signals in accordance with the present invention.

FIG. 1 shows an embodiment of the method of compressing image signals in accordance with the present invention, wherein the original signals are comprised of 2,000×2,000 picture elements, each of 8 bits and 0 to 255 levels.

First, smoothing processing is carried out for the original image signals. Smoothing processing may be, for example, moving average filter processing wherein an average value of the image signal at a remark picture element and the image signal at a picture element in the vicinity of the remark picture element is taken as a new image signal of said remark picture element. Specifically, with the moving average filter processing, a mask M having a picture element size of 3×3 as indicated by the hold line in FIG. 2 is prepared for example, and is disposed so that a remark picture element P is positioned at the center of the mask M. The average value of image signals a through i at nine picture elements contained in the mask M is calculated by the formula as shown below and is taken as a new image signal a' of the remark picture element P.

$$a' = \frac{a + b + c + d + e + f + g + h + i}{9}$$

Such processing is carried out for every picture element (each cell as indicated by the thin line in FIG. 2 represents one picture element). Of course, the size of the mask M is not limited to the 3×3 picture elements. Besides moving average filter processing, for example, linear or nonlinear filter processing such as digital convolution or median filter processing may be carried out as smoothing processing.

When smoothing processing is carried out as mentioned above, it is possible to improve the correlation between the image signals at the nearby picture elements, and to increase the degree of concentration of prediction errors in prediction encoding compressing processing at points near zero, thereby to improve the signal compressibility.

After smoothing processing is carried out for the image signals, the image signals are divided into main signals sampled at appropriate intervals and interpolation signals other than the main signals.

Sampling of the main signals may be carried out in various manners insofar as the main signals are sampled so that they are present sparsely, coarsely and approximately uniformly at predetermined intervals on the image. In this embodiment, as shown in FIG. 3, the main signals are sampled at intervals of two picture elements in the transverse direction and in the longitudinal direction. Specifically, the image signals at picture elements x11, x13, x15, ..., x31, x33, x35, ..., x51, x53, x55, ... as indicated by circles in FIG. 3 (each cell in FIG. 3 represents one picture element) are sampled as the main signals, and the image signals at the other picture elements are taken as the interpolation signals. FIG. 4 shows the main signals a11, a13, a14, ... and the interpolation signals b12, b14, b16, ... divided in this manner.

The intervals of sampling of the main signals may be selected as desired. For example, besides the sampling intervals of two picture elements in the transverse direction and in the longitudinal direction, sampling intervals of three picture elements in the transverse direction and in the longitudinal direction or sampling intervals of four picture elements in the transverse direction and in the longitudinal direction may be employed. Or, the sampling interval in the longitudinal direction and the sampling interval in the transverse direction may be different from each other such that the former corresponds to two picture elements and the latter corresponds to three picture elements. Also, as shown in FIG. 5, in the case where the sampling intervals in the longitudinal direction and in the transverse direction are two picture elements for example, the sampling phases may be deviated from each other so that the sampling phases of the main signals a11, a13, a15, ... and the main signals a32, a34, a36, ... are deviated from each other by a phase of a single picture element in the transverse direction.

For example, in the case of an X-ray image for medical diagnosis, the main signals should preferably be sampled so that the ratio of the number of the main signals to the number of the interpolation signals is within the range of 1:3 (for example, in the case where the sampling intervals in the longitudinal direction and in the transverse direction correspond to two picture elements) to 1:8 (for example, in the case where the sampling intervals in the longitudinal direction and in the transverse direction correspond to three picture elements). When the number of the main signals is smaller than this range, i.e. when the main signals are sampled more coarsely, prediction errors of the interpolation signals become large in the coarse of predicting the interpolation signals from the main signals and encoding the prediction errors in the subsequent step, and therefore there arises the risk of the compressibility of the interpolation signals by prediction encoding becoming low.

As for the main signals divided from the interpolation signals as mentioned above, prediction encoding processing is carried out between the main signals. As for the interpolation signals, prediction encoding processing is carried out based on the main signals. Also, in this embodiment, quantization processing for making the bit resolution coarse is carried out only for the interpolation signals.

When an image signal among the image signals is considered, it may be considered that the remark image signal attains a signal value resembling the value of the image signal in the vicinity of the remark image signal. Therefore, when the value of the remark image signal is predicted by an appropriate method from the value of the image signal in the vicinity of the remark image signal, and the difference between the actual signal value and the predicted value, i.e. the prediction error, is calculated, the distribution of the prediction errors thus calculated is concentrated in the vicinity of zero. In the aforesaid prediction encoding, by the utilization of the characteristics that the prediction errors are concentrated in the vicinity of zero, the prediction errors are encoded by variable length encoding (such encoding that the code lengths vary in accordance with the values), for example, Huffman encoding, wherein a short code is allocated to a value having a high frequency and a long code is allocated to a value having a low frequency. In this manner, redundancy of the image signals is restricted, and the total amount of signals is compressed.

First, prediction encoding processing of the main signals a11, a13, a15, ... as shown in FIG. 4 will be described hereinbelow. Prediction encoding processing of the main signals is carried out between the main signals. Specifically, the value of a main signal is predicted based on the value of the other main signal. In this embodiment, prediction encoding processing of the main signals is carried out by previous value prediction plus Huffman encoding processing as one of the prediction encoding processing methods.

Specifically, previous value prediction is carried out for the main signals, a11, a13, a15, ... shown in FIG. 4, and prediction errors $\Delta a13$, $\Delta a15$, ... as shown in FIG. 6 are calculated. The image signals a11, a31, a51, ... standing at the head are left as they are. With previous value prediction, the value of a remark image signal is predicted to be equal to the value of the image signal present prior to the remark image signal, and the difference (i.e. the prediction error) between the predicted value (i.e. the value of the image signal present prior to the remark image signal) and the actual value of the remark image signal is calculated. For example, the prediction errors are calculated as $$\Delta a13 = a13 - a11, \Delta a15 = a15 - a13, \ldots$$

$$\Delta a33 = a33 - a31, \Delta a35 = a35 - a33, \ldots$$

$$\Delta a53 = a53 - a51, \Delta a55 = a55 - a53, \ldots$$

After the prediction errors are calculated as mentioned above, the raw signals a11, a31, a51, ... standing at the head and the prediction errors $\Delta a13$, $\Delta a15$, ..., $\Delta a33$, $\Delta a35$, ..., $\Delta a53$, $\Delta a55$, ... in FIG. 6 are encoded based on a Huffman code table into compressed image signals a11', $\Delta a13'$, $\Delta a15'$, ... as shown in FIG. 7. In this manner, the previous value prediction plus Huffman encoding processing is completed.

Then, prediction encoding processing and quantization processing for making the bit resolution coarse are carried out as described below for the interpolation signals b12, b14, b16, ... shown in FIG. 4. Prediction encoding processing of the interpolation signals is carried out by predicting the values of the respective interpolation signals on the basis of the main signals. In this embodiment, prediction encoding of the interpolating signals is carried out by interpolation prediction plus Huffman encoding processing, and quantization processing for making the bit resolution coarse is carried out for the prediction errors in prediction encoding processing.

Specifically, the interpolation signals b12, b14, b16, ..., b21, b22, b23, ..., b32, b34, b36, ... shown in FIG. 4 are interpolation predicted based on the main signals, and the prediction errors are calculated. The prediction errors are quantized coarsely, and the coarsely quantized prediction errors are encoded based on a Huffman code table.

As an example of interpolation prediction, prediction functions for calculating predicted values B12, B21 and B22 of the interpolation signals b12, b21 and b22 are shown below. The other interpolation signals may be predicted by use of similar prediction functions.

$$B12 = \frac{a11 + a13}{2}, B21 = \frac{a11 + a31}{2}$$

$$B22 = \frac{a11 + a13 + a31 + a33}{4}$$

Interpolation prediction is carried out for the respective interpolation signals as mentioned above, and differences between the predicted values and the actual signal values, i.e. prediction errors $\Delta b12$, $\Delta b14$, $\Delta b16$, ..., $\Delta b21$, $\Delta b22$, $\Delta b23$, ... as shown in FIG. 8 are calculated. Then, the prediction errors are quantized coarsely, i.e. quantization is carried out for making the bit resolution coarse.

In short, it is only necessary that quantization processing for making the bit resolution coarse be carried out so that the bit resolution (the number of levels) of the image signals after quantization becomes lower than the bit resolution (the number of levels) of the image signals before quantization. Therefore, for example, quantization processing may be of the type ordinarily employed wherein the overall image signals are quantized uniformly. However, in this embodiment, instead of the ordinary quantization, shift quantization is carried out in such a manner that deterioration of the visual image quality caused by coarse quantization, i.e. generation of artifacts or the like, is restricted.

In the aforesaid shift quantization, instead of uniformly quantizing the overall original signals (i.e. the prediction errors of the interpolation signals in this case) which are to be quantized, a plurality of (e.g. two) such quantization characteristics that the numbers of levels after quantization are approximately equal to each other and positions of quantization steps are deviated from each other in the quantization width direction are determined in the course of quantization. Also, the original signals which are to be quantized are divided into a plurality of minute blocks composed of, for example, a single signal or a plurality of adjacent signals. The original signals in the respective blocks are quantized by exchanging the quantization characteristics for each of the blocks. For example, quantization characteristics I and II are determined, and quantization is conducted by sequentially exchanging the quantization characteristics I and II so that the original signal or original signals in one block are quantized based on the quantization characteristics I, the original signal or original signals in the block adjacent to said block are quantized based on the quantization characteristics II, and the original signal or original signals in the block adjacent to said adjacent block are quantized based on the quantization characteristics I. In this manner, it is possible to provide the image with an apparent bit resolution several times the bit resolution (number of levels) of the respective quantization characteristics on the basis of the visual integration effect of the human eye, thereby to restrict the generation of artifacts.

With the shift quantization in this embodiment, blocks each comprising a single original signal (i.e. a single prediction error) which is to be quantized is determined as the aforesaid minute blocks, and quantization is carried out by exchanging the different quantization characteristics I and II for each of the blocks, i.e. for each of the prediction errors.

Selective application of the different quantization characteristics I and II to the respective prediction errors may be effected in various manners. However, the quantization characteristics I and II should preferably be exchanged so that adjacent prediction errors (adjacent blocks) are quantized with different quantization characteristics. For example, the quantization characteristics I and II should preferably be exchanged so that the quantization characteristics I are applied to the prediction errors $\Delta b12$ and $\Delta b21$ among the prediction errors shown in FIG. 8, the quantization characteristics II are applied to the prediction error $\Delta b22$, and so on.

As mentioned above, the aforesaid different quantization characteristics I and II are such that the numbers of levels after quantization are equal to each other, and the positions of the quantization steps are deviated from each other in the quantization width direction. In this embodiment, the quantization characteristics as indicated by the white dots in FIG. 9 are employed as the quantization characteristics I, and the quantization characteristics as indicated by the black dots in FIG. 9 are used as the quantization characteristics II. With the quantization characteristics I as shown in FIG. 9, the prediction errors (original signals) of 511 levels from the level −255 to the level +255 are coarsely quantized to the signals of 255 levels (i.e. approximately to one half). Specifically, two levels of the original signals are rendered as one level such that levels −255 and 31 254 of the original signals are rendered as level −255, levels −253 and −252 are rendered as level −253, and levels −251 and −250 are rendered as level −251 (in this case, at the original signal regions of levels 253, 254 and 255, three levels are rendered as one level after quantization for reasons relating to the processing of terminal signals). Also, with the quantization characteristics II as shown in FIG. 9, the original signals of 511 levels are coarsely quantized to signals of 255 levels. Specifically, two levels of the original signals are rendered as one level such that levels −255, −254 and −253 of the original signals are rendered as level −254, levels −252 and −251 are rendered as level −252, and levels −250 and −249 are rendered as level −250 (in this case, at the original signal regions of levels −255, −254 and −253, three levels are rendered as one level after quantization for reasons relating to the processing of terminal signals). Also, the positions of the quantization steps of the quantization characteristics II are deviated from the positions of the quantization steps of the quantization characteristics I in the quantization width direction.

Specifically, the black dots and the white dots in FIG. 9 indicate the relationship between the original signals and the quantized signals. In FIG. 9, lines connecting the black dots or the white dots which become the same level after quantization are defined as the quantization step. That is, in the case of the quantization characteristics I, the line connecting the white dots at the level −3 and −2 of the original signals, the line connecting the white dots at the levels −1 and 0, the line connecting the white dots at the levels 1 and 2, and so on are defined as the quantization steps. In the case of the quantization characteristics II, the line connecting the black dots at the levels −2 and −1 of the original signals, the line connecting the black dots at the levels 0 and 1, the line connecting the black dots at the levels 2 and 3, and so on are defined as the quantization steps. Also, the width of the quantization step, i.e. the size of the range of the original signals which are rendered as a single level after quantization, is defined as the quantization width. In this case, as shown in FIG. 9, the quantization steps of the quantization characteristics I and the quantization steps of the quantization characteristics II are deviated from each other by one half of the quantization width in the quantization width direction, i.e. in the horizontal axis direction representing the original signal levels in FIG. 9.

Though the block composed of a single prediction error is employed as the minute block in the course of division of the prediction errors in the aforesaid embodiment, the minute block may also be a block composed of a plurality of prediction errors, for example, two or three prediction errors. However, when the minutes block is too large, it is impossible to substantially obtained the visual integration effect of the human eye. Therefore, the minute blocks must be adjusted suitably for obtaining the visual integration effect.

FIG. 10 shows an example of the application of the quantization characteristics I and II in the case where a block composed of three prediction errors as indicated by the bold line is employed as the minute block. In this case, the same quantization characteristics are applied to the prediction errors in a single block, and the quantization characteristics I and II are exchanged for each of the adjacent blocks.

As the plurality of such quantization characteristics is such that the numbers of levels after quantization are approximately equal to each other and the positions of the quantization steps are deviated from each other in the quantization width direction, besides the quantization characteristics I and II employed in the aforesaid embodiment as shown in FIG. 9, it is also possible to employ a plurality of quantization characteristics as shown in FIGS. 11 to 16.

Figure 11:
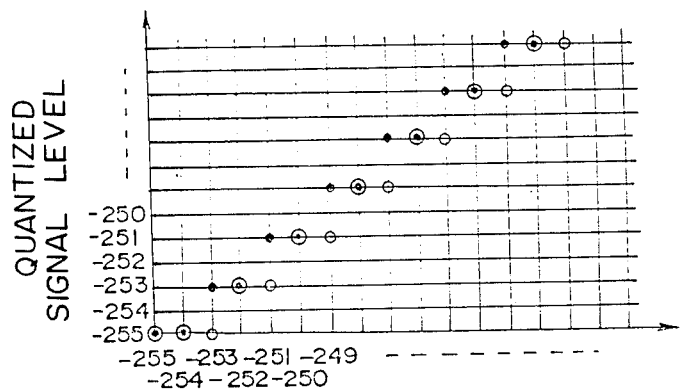
FIGS. 11, 12, 13 and 14 are explanatory views showing examples of combinations of different quantization characteristics used for shift quantization.

FIG. 11 shows a combination of quantization characteristics I as indicated by white dots with quantization characteristics II as indicated by black dots. In the quantization characteristics I and II as shown in FIG. 11, the positions of the quantization steps are deviated only in the quantization width direction, though the positions of the quantization steps of the quantization characteristics I and II in FIG. 9 are deviated both in the quantization width direction and in the direction (vertical axis direction) normal to the quantization width direction.

Figure 12:
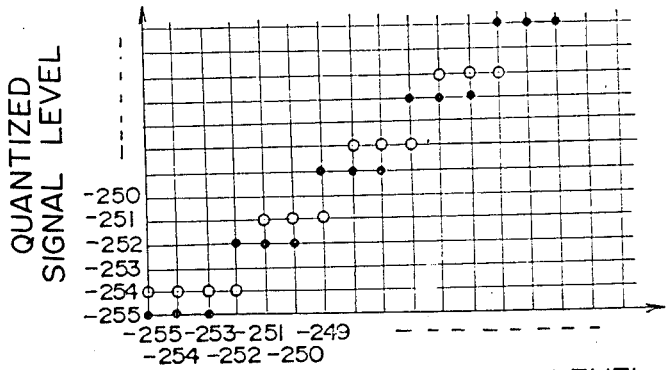

FIG. 12 shows a combination of quantization characteristics I as indicated by white dots with quantization characteristics II as indicated by black dots. In the quantization characteristics I and II as shown in FIG. 12, the quantization widths are of three levels, though the quantization widths of the quantization characteristics I and II in FIG. 9 are of two levels. In the case of FIG. 12, the number of levels of the signals after quantization is decreased to one third of the number of levels of the original signals.

Figure 13:
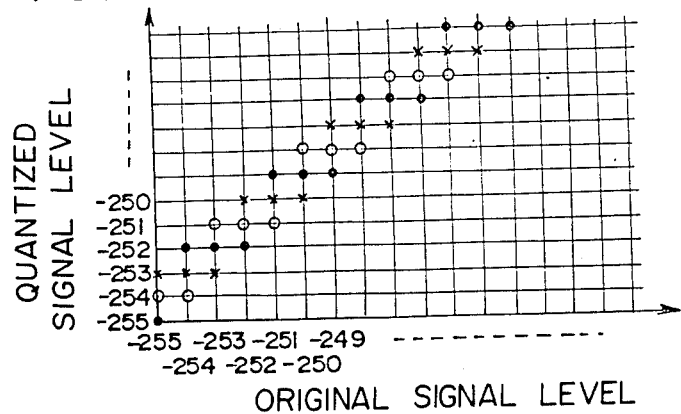

FIG. 13 shows a combination of quantization characteristics I, II and III respectively indicated by white dots, black dots, and "x" marks. As in the case of the two different quantization characteristics shown in FIG. 9, the quantization characteristics I, II and III as shown in FIG. 13 are such that the numbers of levels after quantization are approximately equal to each other and positions of quantization steps are deviated from each other in the quantization width direction. In the case where three quantization characteristics are used as shown in FIG. 13, they may be sequentially exchanged for adjacent blocks such that, for example, when one block is composed of a single signal, the quantization characteristics I are applied to the original signal (prediction error) Δb12 in FIG. 8, the quantization characteristics II are applied to the original signal Δb21, and the quantization characteristics III are applied to the original signal Δb22, and so on.

Figures 14, 15:
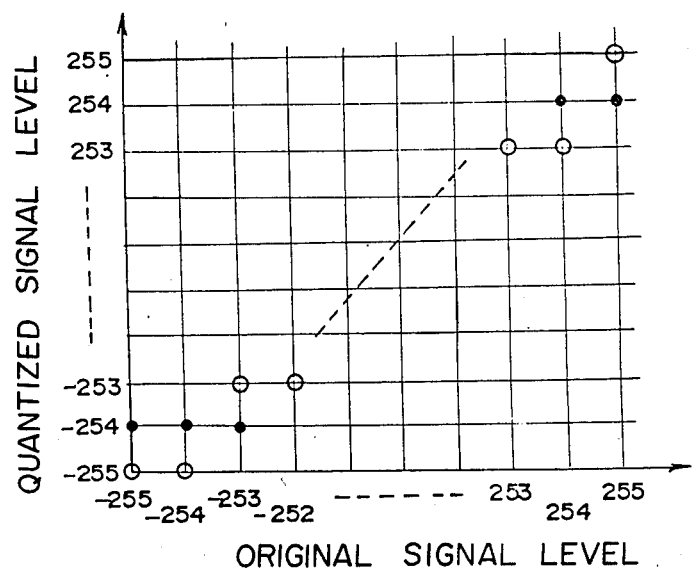
FIG. 15 is an explanatory view showing an example of minimum error quantization.

FIG. 14 shows quantization characteristics which are approximately identical with those shown in FIG. 9, except for the end regions. Specifically, the number of levels after quantization with the quantization characteristics indicated by the black dots is smaller by one than the number of levels after quantization with the quantization characteristics indicated by the white dots. Thus the numbers of levels after quantization are not exactly equal to each other between the quantization characteristics indicated by the black dots and the quantization characteristics indicated by the white dots. The numbers of levels after quantization need not necessarily be exactly equal to each other by the processing of the end regions.

As will be understood from the aforesaid examples, a plurality of the quantization characteristics usable in the aforesaid embodiment should merely satisfy the requirement that the numbers of levels after quantization are approximately equal to each other and the positions of the quantization steps are deviated from each other in the quantization width direction. The number of the quantization characteristics and the size of the quantization width may be adjusted to various values.

In general, by "quantization" is meant processing of representing values x (original signals) satisfying the condition $x_i \leq x \leq x_{i+1}$ by $X_i$ (representative quantization value). Stated differently, quantization means the process of replacing original signals x within a quantization width range $(x_i \sim x_{i+1})$ by a single representative quantization value $X_i$.

In general quantization, for example, the value $x_i$ or the value $x_{i+1}$ at the end of the quantization width range $(x_i \sim x_{i+1})$ or the median value $(x_i + x_{i+1})/2$ has heretofore been employed as the representative quantization value $X_i$. Also in the aforesaid embodiment, as shown in FIGS. 9 and 13 for example, the value $x_i$ or the value $x_{i+1}$ at the end of the quantization width range $(x_i \sim x_{i+1})$ is employed as the representative quantization value $X_i$.

However, the quantization objective signals in the aforesaid embodiment are the prediction errors. In the case of the prediction errors, the frequency distribution thereof is not uniform, and is markedly inclined toward zero as mentioned above. Therefore, when the value at the end of the quantization width range, the median value of the quantization width range, or the like is simply employed, as is, as the representative quantization value without considering the frequency distribution, the total (hereinafter referred to as the quantization error) of the differences between the representative quantization value and the respective original signals (prediction errors) within the quantization width range represented by the representative quantization value cannot attain the minimum value. Specifically, the representative quantization value should preferably be adjusted so that the quantization error becomes the minimum. When the representative quantization value is not the minimum, deterioration of the image quality becomes larger than when the representative quantization value is the minimum. Therefore, the aforesaid conventional method of determining the representative quantization value is not so desirable.

Accordingly, in the course of determining the representative quantization value for each of quantizations in the aforesaid embodiment, i.e. the quantization based on the quantization characteristics I and the quantization based on the quantization characteristics II, a value obtained by weighted averaging of the original signals in the quantization width range based on the frequency distribution, or a value close to the said value obtained by weighted averaging should preferably be employed as the representative quantization value so that the quantization error becomes the minimum.

The representative quantization value as mentioned above is expressed by the following formula.

$$X_i = \frac{\int_{xi}^{xi+1} f(x) \cdot x \, dx}{\int_{xi}^{xi+1} f(x) \, dx} \quad \text{(i)}$$

where x designates the original signals (prediction errors), and f(x) denotes the frequency of the original signals x.

FIG. 15 shows examples of the representative quantization value determined by consisting the frequency distribution as mentioned above. In FIG. 15, three levels of the original signals are determined as a single quantization width range. For example, each of (−4, −3, −2), (−1, 0, 1) (2, 3, 4), and so on is determined as a single quantization width range. The representative quantization values of the respective quantization width ranges are calculated by the Formula (i) shown above, and adjusted as indicated at representative quantization values (1). By way of example, the representative quantization value $X_i$ of the quantization width range (2, 3, 4) is calculated as $$X_i = \frac{(20 \times 2) + (5 \times 3) + (2 \times 4)}{20 + 5 + 2} \approx 2.3$$

The aforesaid representative quantization value need not necessarily be the weighted mean based on the frequency distribution, and may also be a value close to the weighted mean. For example, the representative quantization value may be adjusted to be an integer value close to the weighted mean for facilitating the encoding which is carried out later. The representative quantization values adjusted in this manner are indicated as representative quantization values (2) in FIG. 15.

Though the quantization width range is adjusted to be three levels in the aforesaid examples, the representative quantization values can be determined in the same manner also in the case where the quantization width range is composed of two levels.

As the aforesaid frequency distribution, the actual frequency distribution of all of the original signals (prediction errors) may be calculated and used. Or, several patterns of original signal distributions may be determined in advance based on the information on the original signals which are to be processed, for example, the information on the image which is to be processed, and an appropriate pattern of the frequency distribution may be selected from the predetermined patterns and used as the aforesaid frequency distribution.

After the prediction errors of the interpolation signals are calculated and quantized coarsely, the coarsely quantized prediction errors are Huffman encoded. Prediction encoding of the interpolation signals is completed with this step.

Figure 16:
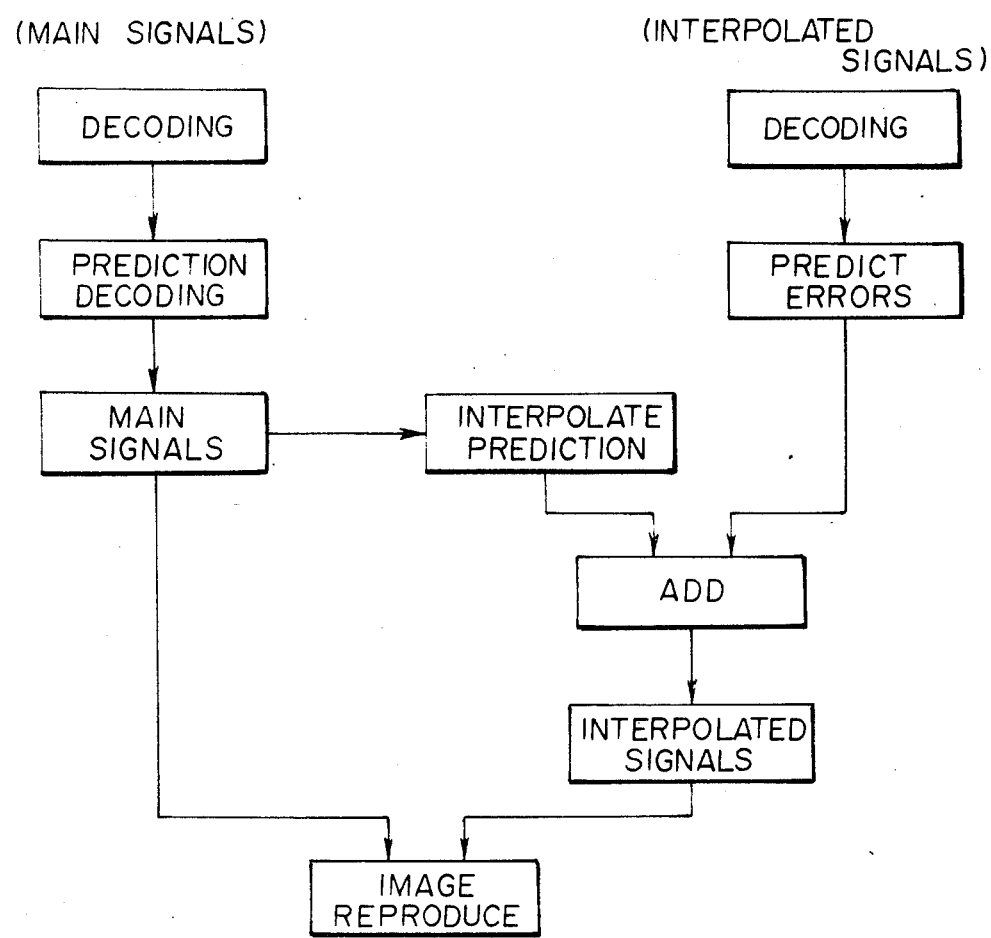
FIG. 16 is a flow chart showing an example of an expansion process for expanding the compressed main signals and interpolation signals.

The compressed image signals (compressed main signals and compressed interpolation signals) created by prediction encoding processing as mentioned above are stored on a storage medium such as an optical disk, and then read out from the storage medium when necessary. Or, the compressed image signals are transmitted by a facsimile system or the like. Thereafter, as shown in FIG. 16, the compressed image signals are processed in an expansion step and, for example, reproduced into a visible image on a CRT or the like.

The expansion step shown in FIG. 16 will be described hereinbelow.

First, decoding processing is carried out for the main signals compressed and encoded into Huffman codes as shown in FIG. 7, and the respective raw signals at the head and the prediction errors as shown in FIG. 6 are obtained. Decoding processing may be carried out based on the Huffman code table which was used in the course of effecting the aforesaid Huffman encoding processing. Then, prediction decoding processing is carried out by use of the raw signals at the head and the prediction errors decoded in this manner and the prediction formulas used in the course of the aforesaid prediction. Specifically, the expanded main signals a11, a13, a15, . . . , a31, a33, a35, . . . , a51, a53, a55, . . . as shown in FIG. 4 are calculated as shown below.

$a11 = a11, \ a13 = a11 + \Delta a13, \ a15 = a13 + \Delta a15, \ldots$ $a31 = a31, \ a33 = a31 + \Delta a33, \ a35 = a33 + \Delta a35, \ldots$ After the main signals are decoded and expanded as mentioned above, the interpolation signals are decoded and expanded by use of the main signals.

In the course of decoding and expanding the interpolation signals, the interpolation signals compressed and encoded into the Huffman codes as mentioned above are decoded based on the Huffman code table which was used for the Huffman encoding processing as in the case of the main signals, and the prediction errors are calculated in this manner. The interpolation signals b12, b14, b16, . . . , b21, b22, b23, . . . , b32, b34, b36, . . . are calculated by use of the prediction errors thus calculated, the main signals decoded and expanded as mentioned above, and the interpolation prediction formulas which were used in the course of carrying out the aforesaid prediction. Specifically, predicted values B12, B14, B16, . . . of the interpolation signals b12, b14, b16, . . . are calculated by use of the interpolation prediction formulas based on the aforesaid main signals, and the prediction errors $\Delta b12$, $\Delta b14$, $\Delta b16$, . . . are added to the predicted values B12, B14, B16, . . . to obtain the interpolation signals b12, b14, b16, . . . .

After the main signals and the interpolation signals are decoded and expanded in the aforesaid manner, the image may be reproduced on a CRT or the like based on the expanded signals. Prior to the image reproduction, post-processing for emphasizing the high spatial frequency components may be carried out for the expanded signals.

Specifically, in this embodiment, smoothing processing has been carried out at the initial stage as mentioned above and the high spatial frequency components of the image have been decreased by smoothing processing. Therefore, when the visible image is reproduced by directly using the expanded image signals, the reproduced visible image includes only a few high spatial frequency components, and there is the risk of the reproduced visible image becoming blurred as compared with the original image. Accordingly, blurring is eliminated by processing for emphasizing the high spatial frequency components, so that a visible image having an image quality closer to the original image is reproduced.

Processing for emphasizing the high spatial frequency components may be carried out in various manners, for example, by unsharp mask processing, convolution processing, or Fourier transformation.

In short, the method of compressing image signals in accordance with the present invention is characterized by dividing image signals into main signals sampled at appropriate intervals and interpolation signals other than the main signals, carrying out prediction encoding between the main signals, subjecting the interpolation signals to prediction encoding based on the main signals, and carrying out quantization for making the bit resolution coarse at least for the interpolation signals.

As described with reference to the aforesaid embodiment, division of the image signals into the main signals and the interpolation signals may be carried out in various manners by considering the image quality of the reproduced visible image and the signal compressibility.

As prediction encoding processing of the main signals and the interpolation signals, previous value prediction is carried out in the case of the main signals, and interpolation prediction based on the main signals is carried out in the case of the interpolation signals in the aforesaid embodiment. However, the prediction may be effected in any other manners. Also, encoding of the prediction errors may be carried out by variable length encoding other than Huffman encoding.

Though only the interpolation signals are coarsely quantized in the aforesaid embodiment, both the main signals and the interpolation signals may be coarsely quantized. In this case, the interpolation signals are quantized more coarsely than the main signals. For example, the main signals are coarsely quantized so that the number of levels is halved, and the interpolation signals are coarsely quantized so that the number of levels is reduced to a value within the range of one third to one fourth. When the quantization coarseness is made different between the quantization of the main signals and the quantization of the interpolation signals, particularly when the interpolation signals are quantized more coarsely than the main signals, it is possible to efficiently achieve both the effect of improving the signal compressibility by coarse quantization and the effect of restricting deterioration of the visual image quality and a decrease in the diagnostic efficiency and accuracy caused by coarse quantization. Specifically, as mentioned above, the main signals may be regarded as representing the low spatial frequency components, and the interpolation signals may be regarded as representing the high spatial frequency components. When the main signals and the interpolation signals are compared with each other, the main signals are more important than the interpolation signals from the viewpoint of ensuring high diagnostic efficiency and accuracy and the viewpoint of maintaining the visual image quality. In view of the above, the tolerance of coarse quantization is lower for the main signals than for the interpolation signals. Therefore, when the image signals are coarsely quantized uniformly, the quantization coarseness must be determined with reference to the main signals for which the tolerance of coarse quantization is low, and improvement of signal compressibility by coarse quantization cannot be achieved substantially. However, with the division of main signals and interpolation signals in accordance with the present invention, it is possible to quantize the interpolation signals more coarsely than the main signals up to the quantization tolerance limit of the interpolation signals, and thereby to markedly improve the signal compressibility without adversely affecting the diagnostic efficiency and accuracy and the visual image quality. The degree of decrease of the number of levels in the course of coarse quantization of the interpolation signals may be adjusted with respect to the relationship with the image quality at the time of image reproduction, and should preferably be adjusted to a value within the range of one half to one fourth.

In the aforesaid embodiment, the quantization of the interpolation signals is carried out by coarsely quantizing the prediction errors. However, for example, the quantization of the interpolation signals may be carried out just prior to the interpolation prediction of the interpolation signals in FIG. 1, i.e. may be applied directly to the interpolation signals. Also, regardless of whether the quantization is effected for the prediction errors or directly for the interpolation signals, the quantization may be carried out in various manner. Thus the quantization of the interpolation signals need not necessarily be the shift quantization as in the aforesaid embodiment, and the minimum error quantization wherein the quantization error is made smallest.

Also, the quantization of the main signals may be carried out by directly quantizing the main signals, or by quantizing the prediction errors after linear prediction. Also, the quantization of the main signals may be effected in various manners as in the case of the quantization of the interpolation signals.

Though smoothing (pre-processing) and processing (post-processing) for emphasizing the high spatial frequency components are carried out in the aforesaid embodiment, these processing steps may be carried out only when necessary. Further, pre-processing other than smoothing and post-processing other than processing for emphasizing the high spatial frequency components may be added when necessary.

I claim:

1. A method of compressing digital image signals, which comprises the steps of:
   (i) dividing said image signals into main signals sampled at appropriate intervals and interpolation signals other than said main signals,
   (ii) as for said main signals, carrying out prediction encoding compression processing between said main signals
   (iii) as for said interpolation signals, carrying out prediction encoding compression processing based on said main signals, and
   (iv) as for said interpolation signals, carrying out quantization processing for making the bit resolution coarse in the course of encoding, said quantization processing of said interpolation signals being carried out for making the bit resolution coarser than the bit resolution of said main signals.

2. A method as defined in claim 1 wherein said main signals are sampled so that a ratio of the number of said main signals to the number of said interpolation signals is within the range of 1:3 to 1:8.

3. A method as defined in claim 1 wherein said prediction encoding compression processing of said main signals is carried out by previous value prediction and Huffman encoding.

4. A method as defined in claim 1 wherein said prediction encoding compression processing of said interpolation signals is carried out by interpolation prediction and Huffman encoding.

5. A method as defined in claim 1 wherein said quantization processing of said interpolation signals is carried out for prediction errors in said prediction encoding compression processing.

6. A method as defined in claim 5 wherein said prediction encoding compression processing of said interpolation signals is carried out by interpolation prediction and Huffman encoding, the prediction errors in said interpolation prediction are quantized coarsely, and the coarsely quantized prediction errors are encoded into Huffman codes.

7. A method as defined in claim 1 wherein said quantization processing is shift quantization in which original signals are quantized and are divided into a plurality of minute blocks, and the original signals in the respective minute blocks are quantized into levels having quantization steps by applying a plurality of such quantization characteristics such that the numbers of levels after quantization are approximately equal to each other and the positions of the quantization steps are deviated from each other in a quantization width direction, said quantization characteristics being exchanged for the respective minute blocks.

8. A method as defined in claim 7 wherein said quantization characteristics are exchanged for the respective minute blocks so that different quantization characteristics are applied to adjacent minute blocks.

9. A method as defined in claim 1 wherein a value calculated by weighted averaging of original signals, which are to be quantized, in each quantization width range based on frequency distribution of said original signals, or a value close to a weighted mean value is employed as a representative quantization value of each quantization width range in said quantization processing.

* * * * *